Sept. 1, 1931.   J. W. AMES   1,821,049
METHOD OF AND APPARATUS FOR THE RECOVERY
OF MATTER FROM WASTE RUBBER TIRES
Filed July 16, 1927

INVENTOR
James W. Ames
BY N. F. Bernhard
ATTORNEY

Patented Sept. 1, 1931

1,821,049

UNITED STATES PATENT OFFICE

JAMES W. AMES, OF JERSEY CITY, NEW JERSEY

METHOD OF AND APPARATUS FOR THE RECOVERY OF MATTER FROM WASTE RUBBER TIRES

Application filed July 16, 1927. Serial No. 206,155.

My invention is a method of, and apparatus for, the recovery through the agency of heat of certain solid substances contained in the rubber cement and the rubber material of vehicular tires.

In the attachment of rubber tires to wheel rims of trucks and heavy duty vehicles, it is usual to employ cementitious material for effecting such attachment, said cementitious material including zinc oxid and other mineral substances. Again, in compounding rubber for use in the tires of automobiles, particularly such tires as are unitary with the wheel rims and adapted for service on trucks and heavy duty vehicles, it is usual to incorporate mineral substances with the rubber. So far as I am aware, no system has been proposed, nor have efforts been made, for the recovery of such mineral substances from the tire attaching cement or from the tire rubber, and, accordingly, I believe that I am the first to discover that the mineral substances can be recovered from the cement and from the rubber through the agency of heat acting to consume the volatile constituents of waste rubber of vehicular tires of the cement, such recovery including a residue of mineral substances utilizable in the arts. The residue recovered from the combustion of waste rim rubber of the cementitious agent includes, among other substances, a substantial percentage of zinc in the form of zinc oxid; but analysis of the recoveries from various rubber tires and from the cements used when treated according to my invention, discloses that the recovery includes, in addition to zinc or zinc oxid, other substances of a minor character, and in smaller percentages, such as carbon 4.38%; silica about 6.26%; iron oxid 1.35%; alumina 1.27%; calcium oxid 6.59%; magnesia 9.21%; sulphuric anhydride 5.29%; sulphur and sulphide 1.08%; and lead oxid 4.24%.

Although the analysis conducted by me may and does show different mineral substances, in varying proportions, the aggregate of the components of the recoveries is about as above enumerated, in substantially the proportions stated. While the various substances may or may not all be utilizable in the arts, the metallic zinc, or zinc oxide, and the relatively high proportion of the substances (metallic zinc 48.27%, or zinc oxid 60.08%), renders the recovery a profitable procedure from an economical business standpoint. Subsequent to the heat treatment, there is obtained a recovery composed of various mineral substances, a high content of which is metallic zinc or zinc oxid, and such residual compound is subjected to further purification by procedure ordinary in the recovery arts, whereby the resulting product is zinc useful in various arts.

According to my invention, metal vehicle rims, each containing a relatively small fragment of waste rubber tires, together with the cement for attaching the rims and the tires, are assembled in a mass and placed within a chamber, wherein combustion is started and maintained for an indefinite period. In starting the combustion, it is usual to apply a combustible liquid, such as fuel oil in one form or another, to the assembled mass, and after deposit within the chamber, such mass is ignited, with the result that the oil and the volatile constituents of the rubber cement and the rubber compound are burned. In the progress of the combustion, the mineral substances present in the rubber compound and in the cement used for attaching the tires to the metal rims, drop away from the assembled inflammable mass, and are deposited in the condition of a burning mass upon a refractory surface. At this stage, the mass initially separated from the assembled rims, tire fragments and cement, is in a state of combustion, and such initially separated and burning mass is agitated mechanically at the second stage of the procedure, in order to expose such burning mass of rubber to air and heat, and thereafter the burning mass is transferred to a separate chamber for agitation and combustion at a third stage in the treatment. The combustion at the first, second and third stages of the treatment accorded to the rubber compound, and to the cement material, has the effect of consuming the volatile constituents of the rubber and the cement compound, leaving the mineral residue substantially free from rubber and volatile matters, and this elimination of volatizable components is carried to a determined stage in the recovery by the agitation of the mass at the second stage and at the third stage, in which stages the agitation exposes the massed residue to the oxygen in the air and to the heat, with the ultimate effect of eliminating substantially all the volatile content from the recovery, and reducing the mineral substances to a pulverulent condition, appropriate for further treatment to attain the desired zinc product.

The apparatus in a form which I have used for the commercial recovery of mineral substances, including zinc, from the cement material and from rubber compound of waste tires, embodies a furnace divided by checkerwork into compartments, one of which is a primary combustion chamber, and the other of which is a chamber for secondary combustion designed to eliminate carbon from the gaseous products of combustion. With the primary combustion chamber co-operates appropriate conveying means, one form of which is a wheeled conveyor equipped with a slab of refractory material, and with a superposed grating, upon which grating is loaded the massed wheel rims having tire fragments adherent to such rims. Owing to heat and to the combustion of the volatile substances present in the cement material and in the tire fragments, the minerals incorporated with the cement and the rubber separates from the rims together with fragments of the rubber, and such fragments in a state of combustion drop upon the grating and they drop, also, through the grating of the conveying means, and are deposited upon the refractory slab of said conveying means. At the second stage of treatment, a workman operates a stirrer over the refractory slab to agitate the burning mass, and at a determined period, this mass is transferred to a separate bed on a level with the refractory slab, whereupon the burning mass is again agitated by a stirrer until the volatile components of the rubber are burned out, to facilitate which operation, heat is radiated by the checkerwork and the furnace walls to the material undergoing agitation on the separate bed. At the third combustion stage, the burning mass is worked by the stirrer for a determined period of time so that the mineral residue is the product resulting from this treatment, and thereupon the product is raked off the separate bed and accumulated in a pile for transference to storage bins, or to places where the mineral substances are or may be further treated to obtain the final product.

Other functions and advantages of the invention will appear from the following disclosure taken in connection with the accompanying drawings, wherein,—

Figure 1:
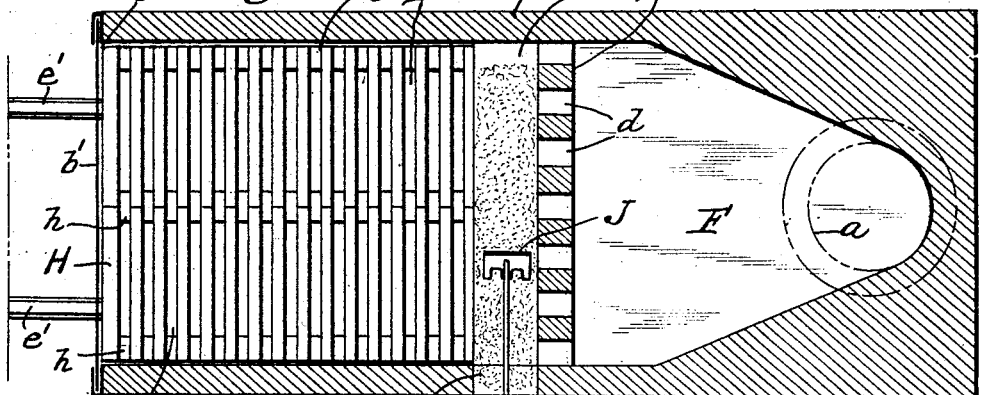
Figure 1 is a sectional plan view of an apparatus suitable for carrying out my invention.
Figure 2:
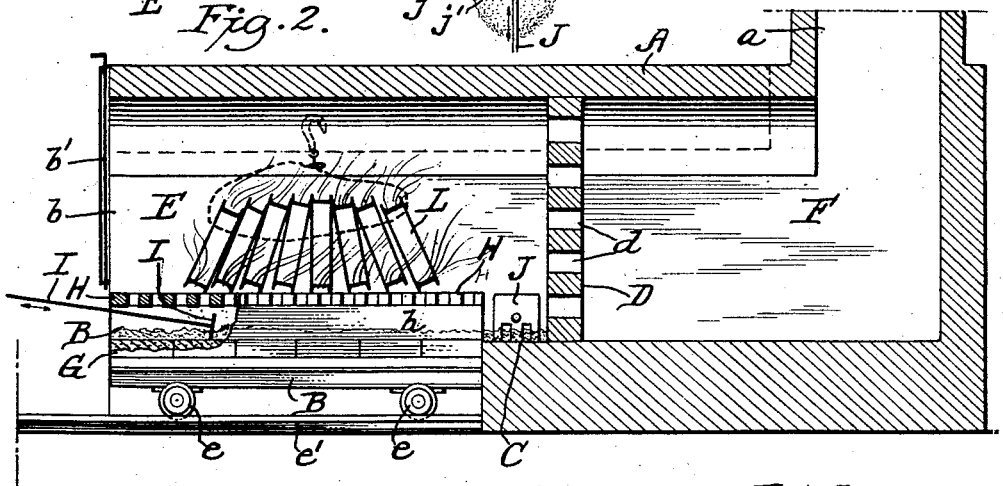
Figure 2 is a vertical longitudinal sectional view thereof.
Figure 3:
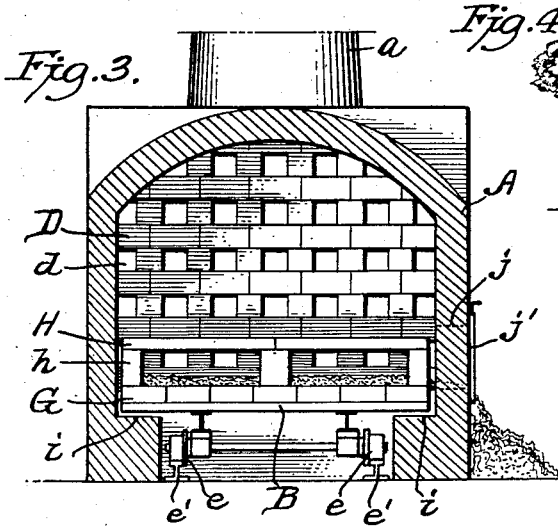
Figure 3 is a vertical cross section through the primary combustion chamber.

Referring now to the apparatus illustrated in Figures 1 to 3, inclusive, A is a furnace having an outlet, $a$, to a stack or uptake for the escape of the waste gaseous products of combustion. Said furnace is open at one end, $b$, for the free introduction of a wheeled conveyor, B, said open end $b$ being closed by a door, $b'$, for confining the heat and other gaseous products of combustion within the furnace. The furnace is provided interiorly thereof with a refractory bed C, and said furnace is divided interiorly by a wall of checkerwork, $d$, into a plurality of chambers, E, F, the former of which constitutes the primary combustion chamber, whereas the latter chamber is a secondary combustion chamber. The checkerwork wall, D, is erected crosswise of the furnace in any manner known to those skilled in the furnace art; usually it is fire brick or slabs with openings, $d$, for the free flow of the gaseous products of combustion. The checkerwork is adjacent the bed C, and it affords a source of supply for heat to the combustible mass at the third stage of the treatment, said checkerwork being heated to an incandescent state by the heat evolved from the burning mass at the first stage of the treatment.

The conveying means shown in the drawings is in the form of a truck, B, mounted on wheels, $e$, is adapted to the rails, $e'$, of a track extending from the outside of the furnace to and entering the chamber, E, up to the line of the transversely extending bed C, see Figure 2. Said truck is equipped with a horizontal slab, G, composed of refractory material, and upon this slab G are erected short walls, $h$, for supporting a metallic grating, H. The bed of the truck is shown in Figure 3 as extending into lapping relation to the shoulders, $i$, provided in the side furnace walls to minimize the downflow of heat from the chamber E to the running gear of the truck. As shown, the grating is carried by the truck in an elevated and spaced relation to the refractory truck slab G, and, furthermore, this refractory slab is in the horizontal plane of the bed C, or substantially so. The burning mass of material present upon the truck slab G is agitated at one stage of the treatment by any suitable means, such as by a stirrer or rake, I, the handle of which extends outside of the furnace so that the stirrer may be manipulated by a workman stationed at the front of the furnace. In like manner, the burning mass present on the bed C is agitated by a stirrer or rake, J, the handle of which extends through a door opening, j, provided in a side wall of the furnace above the bed C, said door opening, j, being closed at times by a door, j', see Figure 1.

Figure 4:
Figures 4 and 5 are views depicting the condition of some of the material at the second stage and the third stage, respectively, of the treatment.
Figure 5:
Figure 6:
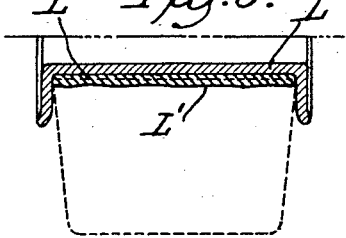
Figure 6 is a detail cross section of a part of a metal wheel rim illustrating the adherent fragments of rubber tire prior to the combustion treatment for the recovery of mineral substances in accordance with this invention.

Prior to the heat treatment for the recovery of mineral substances from rubber tires, etc., in accordance with my invention, each wheel rim with a used rubber tire adhesively attached by a cement compound to the wheel rim, is subjected to the mechanical action of a slicing machine, of the character disclosed in my prior Patent No. 1,624,913, patented by me on April 19, 1927, entitled Means for utilizing waste rubber. The wheel rim with the fragments of rubber tire adhesively attached by a cement layer of appreciable thickness to said rim, presents the appearance depicted in Figure 6 after the usable part of the rubber tire shall have been cut or removed by the action of the machine of my prior patent, said metal wheel rim being indicated at L in Figures 2 and 6, and the fragment of adherent rubber tire being indicated at L' in said Figure 6, and the cement layer is indicated at $L^2$. A number of wheel rims, L, are massed into a group, and tied together by a non-combustible cable or chain, as in Figure 2, and such massed wheel rims are loaded upon the truck, B, the latter being outside of the furnace at the loading operation. Prior to introducing the loaded truck into the furnace, a combustible liquid is poured over the massed rims L, and the rubber tire fragments L', and the loaded truck is then introduced into chamber E, with the slab G on a level with the bed C, see Figures 1 and 2. The combustible liquid is ignited, doors b', j', are closed, and combustion is set up in chamber E, whereupon the fragments of the rubber tires and the cement layers are burned off the metal wheel rims, and the gaseous products of combustion flow through the checkerwork D into chamber F and make their exit through the outlet a to the stack. At the first stage, conducted in chamber E, the volatile components of the cement material and of the rubber tire fragments are burned and drop off in fragmentary pieces from the metal wheel rims, and thus the burning mass detached from the wheel rims, along with the mineral substances initially incorporated in the cement and the substances compounded with the rubber, lodge upon the grading H for combustion thereof, and ultimately such substances pass from the chamber E through the grating H, and lodge upon the refractory slab G of the truck. At the second stage, the burning mass resting on the slab is agitated by a stirrer, I, for a desired length of time, the mass at this stage containing some combustible matter, as depicted graphically in Figure 4. The operator uses the stirrer I to work the burning mass resting on slab G back and forth to expose such mass to the air admitted freely through the door end b of chamber E, and after an appreciable interval, this mass is transferred from the truck slab G to the bed C by working the stirrer I to effect the transfer from the truck to the furnace bed C. The third stage of the treatment is conducted on bed C by the action of the stirrer J, the latter being moved back and forth over the bed C in a direction at a right angle to the path of the stirrer I over the truck slab. The agitation of the burning mass upon the furnace bed C is conducted in the presence of heat supplied by the burning mass itself and by heat radiated from the furnace walls and by the checkerwork D, and during this third stage in the treatment, the volatile matters remaining in the mass are burned out so that the mass is free substantially from combustible matter, its condition being graphically depicted in Figure 5. The residue is a mineral mass substantially or wholly free from volatile matter, and containing a high zinc content, and such mass is raked by the stirrer J off the bed C and through the door opening j, so as to be deposited in a pile at one side of the furnace, see Figure 3, whence the residue of mineral substances is removed for further treatment as by screening, crushing, and by other modes of treatment, to effect the final recovery of metal or metal oxides in accordance with other well known procedures.

It is desired to call attention to the fact that the grating affords means for initially supporting the load, and that its openings provide for the free inflow of the atmospheric air required to support combustion of the burning mass. The rubber fragments and cement material burned off the wheel rims drop at first upon the grating, at which time the rubber fragments continue to burn, and such materials so separated from the rims then drop through the grating and lodge upon the slab G, at which stage the mass is raked over by the stirrer I. Combustion takes place at all stages in the treatment accorded to the materials, and to this end atmospheric air is freely admitted to the furnace through the doors provided in the front and side walls. Again, the checkerwork is heated by the escaping gaseous product of combustion, and some air flows through the checkerwork along with the escaping gases, so as to set up secondary combustion in the chamber F, with a view to eliminating smoke and burning volatile components present in the gases, effecting deodorization at least to a certain extent. If desired, provision may be made for the further treatment of the recovery in the chamber F.

Having thus fully described the invention, what I claim as new and desire to secure by Letters Patent is:

1. In the art of recovering mineral substances from rubber cement and compounds, the process which comprises burning a massed rubber cement and compound to consume the combustible components thereof, and separating the mineral substances from the burning mass.

2. In the art of recovering mineral substances from rubber cement and compounds, the process which comprises assembling into a mass a number of metal wheel rims having adherent rubber tire fragments, burning the rubber tire fragments and the cement to consume the combustible components thereof, and separating the mineral substances by gravity from the burning mass.

3. In the art of recovering mineral substances from rubber cement and compounds, the process which comprises assembling into a mass a number of wheel rims provided with worn rubber tires or parts thereof, each cemented to the rim and compounded initially with a mineral substance, burning the combustible components of said assembled mass, and separating by gravity from the burning mass the non-combustible mineral substances.

4. In the art of recovering mineral substances from rubber compounds, the process which comprises burning rubber tires initially compounded with mineral substances, separating from the burning mass the non-combustible mineral substances, and agitating the separated masses of mineral substances while such separated mass is in the process of further combustion for the elimination therefrom of combustible matter present therein.

5. In the art of recovering mineral substances from rubber compounds, the process which comprises burning rubber tires initially compounded with mineral substances, separating from the burning rubber mass the mineral substances together with fragments of rubber, agitating the separated mineral substances and the rubber fragments, and eliminating at a separate stage the rubber fragments by burning the same while the separated mineral substances are undergoing agitation.

6. In the art of recovering mineral substances from rubber compounds, the process which comprises burning rubber tires initially compounded with mineral substances, separating by gravity from the burning rubber mass the mineral substances together with fragments of rubber, and at successive stages agitating the separated mineral substances and burning the rubber fragments associated with such mineral substances.

7. In the art of recovering mineral substances from rubber compounds, the process which comprises assembling metal wheel rims provided with worn rubber tires initially compounded with mineral substances, burning the assembled rubber tires to free them from the wheel rims, separating the mineral substances by gravity from the burning mass along with fragments of rubber associated with such mineral substances, and agitating at a separate stage the mineral substances and the rubber fragments while the latter are in a state of combustion.

8. The method of recovering mineral substances from rubber masses which comprises burning rubber mixtures containing mineral substances and separating by gravity the mineral substances from the burning mass.

9. The method of recovering mineral substances from rubber masses which comprises subjecting the mass to a preliminary burning, then subjecting the burning mass to the action of radiated heat to complete the burning and afford a better separation of the mineral substances from the combustible organic substances.

10. The method of recovering mineral substances from rubber masses which comprises burning rubber masses containing mineral matter, removing the burning mass and subjecting it to the combined action of radiated heat and a draft of hot gases.

11. The method of recovering mineral substances from rubber masses which comprises subjecting rubber masses containing mineral matter to thermal decomposition, separating by gravity the mineral matter together with fragments of undecomposed rubber and then decomposing the rubber fragments associated with the mineral matter to recover the mineral matter.

12. The method of recovering mineral substances from rubber masses which comprises subjecting a rubber mass to a preliminary burning to eliminate a larger proportion of the organic matter, removing the burning mass and subjecting it to a further burning so as to more completely remove the remaining organic matter.

13. The method of recovering mineral substances from rubber masses which comprises subjecting a rubber mass to a preliminary burning to eliminate a large proportion of organic matter, removing the burning mass and then allowing a heated draft to contact the mass to remove the rest of the organic matter.

14. The method of recovering mineral substances from rubber masses which comprises subjecting a mass of rubber to a preliminary burning to eliminate a large proportion of organic matter, agitating the mass, removing the mass, and then subjecting the mass to the combined action of radiated heat and a draft of hot gases so as to more completely remove the remaining organic matter.

15. The method of recovering mineral substances from rubber masses containing mineral substances which comprises subjecting the mass to a preliminary combustion and then subjecting the mass to a secondary combustion to more completely remove the residual organic matter.

16. The method of recovering mineral substances from rubber masses which comprises burning rubber masses containing mineral substances and separating by gravity the mineral substances from the burning mass and purifying the recovered mineral substances.

17. The method of recovering mineral substances from rubber masses containing mineral substances which comprises subjecting the mass to a preliminary combustion and then subjecting the mass to a secondary combustion to more completely remove the residual organic matter, and purifying the recovered mineral substances.

18. The method of recovering zinc compounds from rubber masses which comprises burning rubber masses containing mineral substances and separating by gravity the mineral substances from the burning mass.

19. The method of recovering zinc compounds from rubber masses which comprises burning rubber masses containing mineral substances and separating by gravity the mineral substances from the burning mass and then purifying the separated mineral substances to obtain a product having a high zinc content.

20. The method of recovering a product containing mineral substances having a major proportion of a zinc compound which comprises burning rubber masses containing mineral substances and separating by gravity the mineral substances from the burning mass.

In testimony whereof I have hereto signed my name this 11th day of July, 1927.

JAMES W. AMES.